United States Patent [19]
Jordon et al.

[11] Patent Number: 4,485,274
[45] Date of Patent: Nov. 27, 1984

[54] SHARING AN AUTOMATIC DIALER AMONG PLURAL COMMUNICATION CHANNELS

[75] Inventors: Frank C. Jordon, Huntington Beach; Knute H. Josifek, Fountain Valley, both of Calif.

[73] Assignee: International Communication Operations Research, Huntington Beach, Calif.

[21] Appl. No.: 415,287

[22] Filed: Sep. 7, 1982

[51] Int. Cl.³ .............................................. H04M 1/26
[52] U.S. Cl. ........................... 179/90 BD; 179/18 BA
[58] Field of Search ........ 179/90 BD, 18 BA, 18 BB, 179/90 B, 90 BB, 18 FG, 18 FF, 5 R, 5 P, 2 A, 2 DP, 2 R, 6.07, 6.11, 6.2; 340/825.13, 825.12

[56] References Cited
U.S. PATENT DOCUMENTS 4,097,696 6/1978 Nyhuis et al. ...................... 179/2 A Primary Examiner—Stafford D. Schreyer
Attorney, Agent, or Firm—Nilsson, Robbins, Dalgarn, Berliner, Carson & Wurst

[57] ABSTRACT

Apparatus and method for selecting one of a plurality of communication channels in response to a preselected signal thereon involve sequentially coupling a primary terminal to a plurality of communication channels until a preselected triggering signal is detected on one of the channels. The coupling process is preferably accomplished by individually coupling the primary terminal to each of the communication channels in a continuously repeating sequence. In a preferred embodiment, the terminal is connectible to an automatic dialer and the communication channels are a plurality of telephone lines. The method then includes activating the automatic dialer to transmit a first preselected sequence of dialing signals along the line carrying the triggering signal.

10 Claims, 4 Drawing Figures

SHARING AN AUTOMATIC DIALER AMONG PLURAL COMMUNICATION CHANNELS

BACKGROUND OF THE INVENTION

This invention relates generally to the communication art and, more particularly, to an apparatus and method for selecting one of a plurality of communication channels in response to a preselected signal thereon.

In a variety of circumstances, it is desirable to selectively couple an operative circuit to one of a plurality of communication channels. For example, microprocessors have been connected to a number of inputs for the purpose of selectively measuring and recording the values of the inputs. In some cases, connection has been accomplished with a MOSFET analog switch or other device designed to selectively pass signals to the microprocessor. The particular input from which signals are passed is chosen by a control signal applied to the switch. Analog switches are also suitable for selection between a plurality of microphone lines in a recording studio. As far as applicants are aware, the above-described MOSFET analog switches have been designed and used strictly for transmission of signals in one direction.

A number of automatic dialers have been proposed for use in telephone systems. The most common such devices are designed to dial a single number. They are typically connected to a single telephone line and are activated either by a telephone switch hook or by a button or switch associated with the dialer. Each telephone line in a system must then have a separate dialer. Another automatic dialing system of which applicants are aware is designed specifically for use with a plurality of telephone lines. In this system, monitoring circuits are provided on the lines for activation by a caller to trigger automatic dialing. When one of the monitoring circuits is activated, it calls up a single number dialer associated with the system. However, the system requires a separate monitoring circuit on each line and therefore is rather costly and inflexible in its application. The system also tends to be slow in operation because the monitor must call up the dialer before the desired number can be dialed.

Therefore, in many applications it is desirable to provide an apparatus for satisfactorily coupling an operative circuit to a plurality of different communication channels. Such an apparatus is particularly desirable in the field of telephone dialing systems.

SUMMARY OF THE INVENTION

The present invention comprises an apparatus and method for selecting one of a plurality of communication channels in response to a preselected signal thereon. The apparatus comprises: primary terminal means connectible to an auxiliary circuit; means for sequentially coupling the primary terminal means to a plurality of communication channels for bidirectional transmission; and means for inhibiting the sequential coupling means in response to a preselected triggering signal on a channel to which the primary terminal means is coupled. The coupling means may comprise means for individually coupling the primary terminal means to each of the communication channels in a continuously repeating sequence. More specifically, the coupling means may comprise counter means for generating digital signals in a continuously repeating sequence and an analog switch controllable by the digital signals for selectively connecting the primary terminal means to the communication channels. In the context of an automatic dialer system for telephone lines, the primary terminal means is connectible to an automatic dialer and the apparatus further comprises means acting in response to the triggering signal to activate the automatic dialer for transmission of a first preselected sequence of dialing signals. The apparatus may still further include means for sensing an answering signal from the line carrying the triggering signal, and means for activating the automatic dialer to transmit a second preselected sequence of dialing signals in response to the answering signal.

The apparatus and method of the present invention permit a plurality of telephone lines or other communication channels to be continuously swept for the purpose of detecting a triggering signal. The sweeping operation is stopped in response to the triggering signal to leave the signal-carrying channel connected to the auxiliary circuit for bidirectional transmission. The apparatus and method are relatively simple and inexpensive to implement, particularly when the coupling means includes a digitally-controlled analog switch. The signal is automatically detected along one of the channels and transmitted to the auxiliary apparatus. In the context of a multi-input microprocessor, any input carrying data will automatically be coupled to the microprocessor for bidirectional transmission between the sender of the data and the microprocessor. The microprocessor is able to both receive and respond to the input until the sweep is reactivated.

In a security system using the apparatus and method of the present invention, a central alarm facility is automatically connected with any of a plurality of input channels carrying a preselected alarm signal. As the signal is detected and displayed, the channel carrying it remains connected to the central facility for bidirectional communication. An operator at the facility can communicate with persons at the location of the alarm or activate a remote device through the communication channel.

In a telephone dialing system, the present invention permits a single dialing apparatus to be actuated by any of a plurality of telephone lines to dial a preselected number with a minimum of delay. The number will commonly be that of a commercial long distance telephone service which answers by computer with a characteristic dial tone and requires the user to dial a personal code of approximately five digits before the area code and number being called. The apparatus of the present invention operates in response to the computer dial tone to produce a second sequence of dialing signals corresponding to the personal code of the user. It then resets and resumes scanning the telephone lines of the system. The caller on the initial line can dial the area code and telephone number of the called party immediately after the personal code is sent, as if he were dialing directly on the telephone line. Because the first and second sequences of dialing signals take place at the rate of approximately 150 milliseconds per signal, the number and personal code required by the commercial telephone service can be dialed by the apparatus of the present invention in a relatively short time. The inconvenience usually associated with the use of such services is therefore minimized.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DESCRIPTION OF THE PREFERRED EMBODIMENTS

Figure 1:
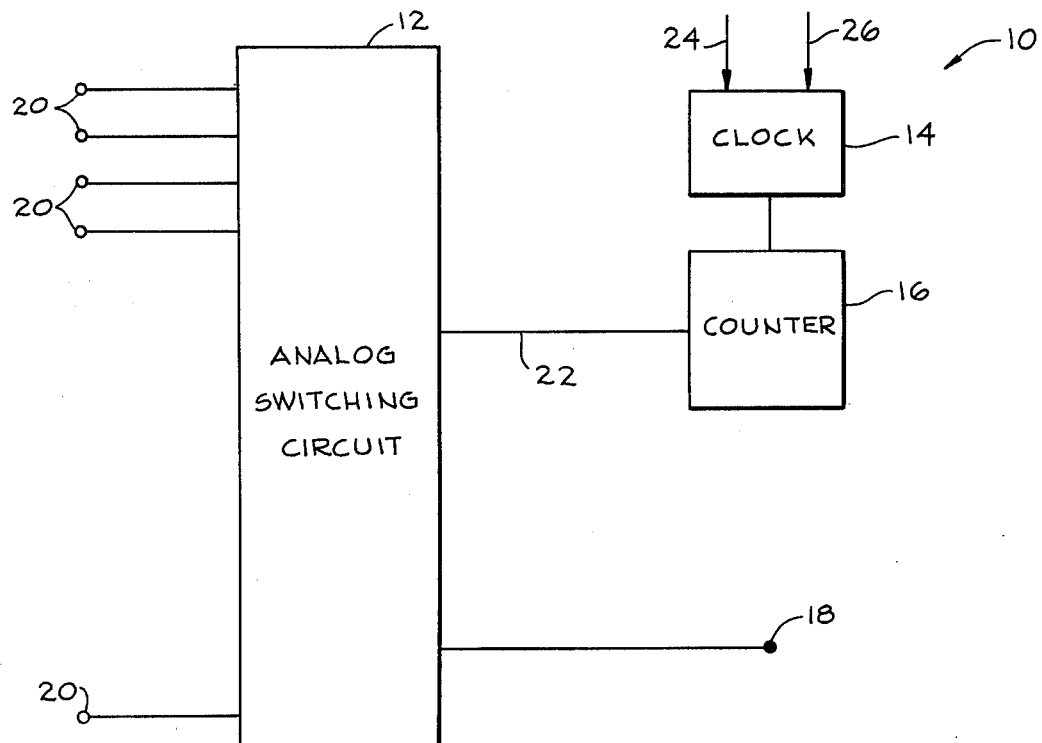
FIG. 1 is a block diagram of a multiline sweep circuit constructed in accordance with the present invention.

Referring now to the drawings, a multiline sweep circuit 10 is illustrated generally in FIG. 1. The sweep circuit comprises an analog switching circuit 12 driven by a clock 14 and a counter 16. The switching circuit has a primary terminal arrangement 18 and a plurality of secondary terminal arrangements 20, and serves to individually couple the primary terminal to the various secondary terminals in response to signals from the counter 16.

The counter 16 acts in response to a timed signal from the clock 14 to apply a repeated counting output to the switching circuit 12 along the line 22. Each count of the counter 16 causes the switching circuit to couple the primary terminal 18 to one of the secondary terminals 20 for bidirectional transmission. Successive counts along the line 22 cause the switching circuit to uncouple the primary terminal from the preceding secondary terminal and connect it to the next one. In this way, the primary terminal 18 is individually connected to the various secondary terminals in successive fashion. The timed output of the clock 14 is typically very rapid, causing the counter 16 to rapidly step through the coupling sequence. Once the sequence is completed, it is repeated by the clock and the counter to provide a continuous scanning or "sweeping" action of the switching circuit 12. The sweep can be terminated at any point by an "inhibit" signal applied to the clock 14 along an input 24, and can be recommenced by an "enable" signal along an input 26. When the sweep is terminated, the counter 16 does not step to the next count in the sequence and the primary terminal remains coupled to the secondary terminal 20 to which it is then coupled. Bidirectional transmission is permitted between the primary terminal and the particular secondary terminal until an enable signal is applied at the input 26. The inhibit function will typically be instigated by a preselected activation or "triggering" signal reaching the primary terminal 18 from one of the secondary terminals.

Figure 2:
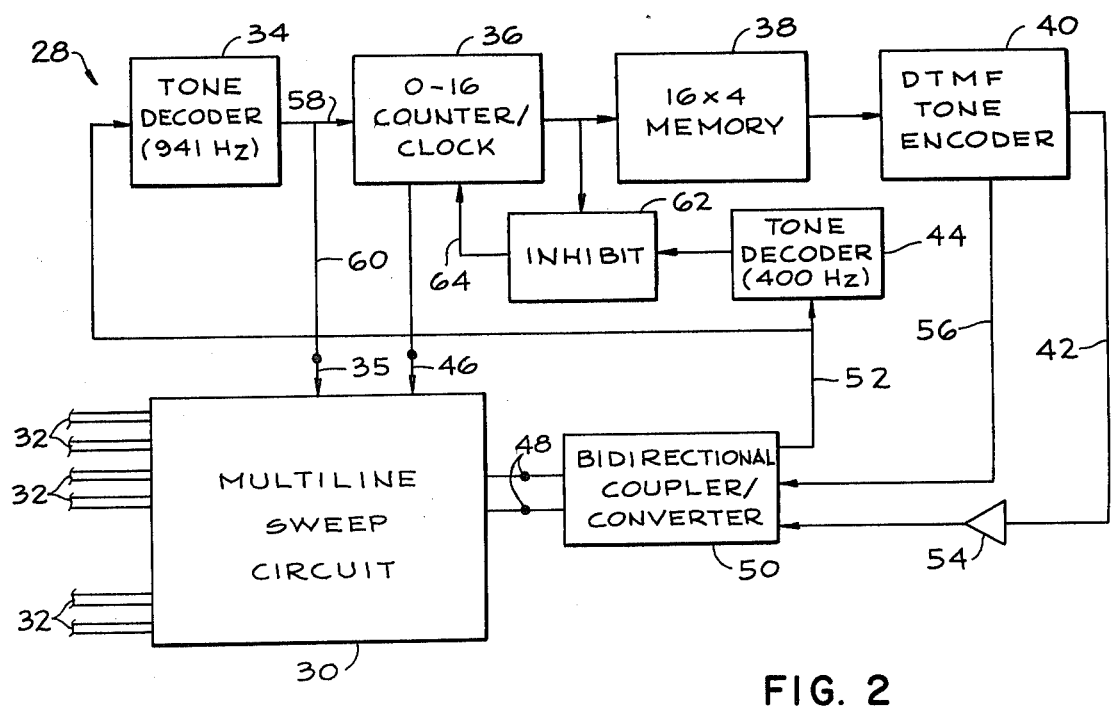
FIG. 2 is a block diagram of a telephone dialing circuit incorporating the multiline sweep circuit of FIG. 1.

Referring now to FIG. 2, there is illustrated a multiline telephone dialing system 28 having a sweep circuit 30 similar to the sweep circuit 10 described above. The circuit 30 sweeps through a plurality of pairs of telephone lines 32, sequentially coupling them to a tone decoder 34 for detection of the preselected triggering signal. When the triggering signal is detected, the tone decoder acts through an input 35 to stop the sweep and lock the system onto the pair of telephone lines carrying the signal. A counter/clock 36 is also activated by the decoder 34. It acts in conjunction with a programmable 16×4 memory 38 and a dual tone multifrequency (DTMF) tone encoder 40 to produce a first preselected sequence of dialing tones along an output line 42. The dialing tones are applied to the pair of telephone lines 32 on which the sweep is stopped, causing them to activate associated telephone circuitry (not shown) and establish a desired telephone connection.

The first sequence of dialing tones will typically correspond to the telephone number of a commercial computerized telephone service of the type specializing in providing long distance service at reduced rates. When the telephone number is reached, a computer at the other end sends back a preselected answering signal to signify that the computer is prepared to receive the personal code of the caller. The answering signal, which may be a conventional computer "dial tone" having a frequency of 400 hertz, is detected by a second tone decoder 44 of the system 28. The decoder 44 then acts to restart the counter/clock 36 to produce a second preselected sequence of dialing tones corresponding to the caller's personal code along the line 42. When the counter/clock 36 finishes its total count, it sends a signal to the sweep circuit 30 along a reset or "enable" line 46, causing the circuit to resume the sweeping process. After being reset, the dialing system 28 is prepared to act again in response to the triggering signal to repeat its automatic dialing sequence.

The sweep circuit 30 is operatively connected to the remainder of the dialing system 28 through a pair of primary terminals 48 and a bidirectional coupler/converter 50. In a normal condition of operation, the coupler/converter 50 passes signals from the sweep circuit to the tone decoders 34 and 44 along a lead 52. In an alternate condition of operation, the coupler/converter passes sequences of dialing tones from the line 42 to the scanner circuit 30. A unity gain amplifier 54 is provided in the line 42 to act as a buffer isolating the tone encoder 40 from the coupler/converter 50. The coupler/converter is actuated from the normal condition to the alternate condition by a high-to-low transition along a line 56 from the tone encoder 40. The low signal level is maintained during transmission of dialing tones along the line 42, after which it reverts to a high level corresponding to the normal mode of the coupler/converter.

In addition to permitting bidirectional transmission between the scanner circuit 30 and the remainder of the dialing system 28, the element 50 acts as a signal converter between the conventional "balanced line" telephone system of the sweep circuit 30 and the common ground system of the remainder of the dialing system.

The tone decoder 34 is a circuit designed to detect the presence of a single tone of a DTMF dialing system in the absence of all other DTMF tones. In a preferred embodiment, the single tone is the 941 hertz tone obtained by simultaneously pressing the "0" and "#" buttons of a conventional DTMF telephone, which tone is not encountered alone at any time during the normal use of the telephone system. The tone decoder 34 will therefore be triggered only when a user purposely activates the dialing system 28. The tone decoder may comprise conventional circuitry for detecting the exclusive presence of a tone. When the tone is detected, an output signal passes along a line 58 to activate the counter/clock 36 and along a line 60 to the inhibit input 35 of the sweep circuit 30.

The counter/clock 36, the memory 38 and the tone encoder 40 comprise a circuit for automatically dialing a number by producing a preselected sequence of dialing signals. The counter/clock includes a counter driven in conventional fashion by a clock to step from "1" to "16" in binary, thereby triggering the memory 38 to sequentially call up the four-place binary coded decimal (BCD) words stored in the memory. The memory 38 also includes a diode matrix connected in conventional fashion to enable two of eight conductive lines (not shown) to the tone encoder 40 in response to each word of information called up from the memory. The tone encoder 40, which is a conventional DTMF encoder, produces a dual tone dialing signal along the line 42 each time that two of its lines are enabled. The output of the counter/clock is also connected to inhibiting circuitry 62 which is designed to produce a feedback signal along a line 64 to the counter/clock when the binary output reaches "8". The feedback signal inhibits the counter/clock, causing the memory 38 and the tone encoder 40 to pause until a computer answering signal is detected by the tone decoder 44 to reset the circuitry 62. When the circuitry 62 is reset, the counter/clock 36 completes its count to 16 and causes the tone encoder 40 to produce a second preselected series of dialing tones corresponding to the user's personal code. The second series of dialing tones activates the answering machine of the commercial telephone system. Upon reaching the count 16, the counter/clock 36 produces a reset signal along the line 46 to cause the sweep circuit 30 to resume its sweep of the telephone lines 32. The desired telephone number can then be called by independent dialing of the telephone originally used to trigger the dialing system.

Figure 3:
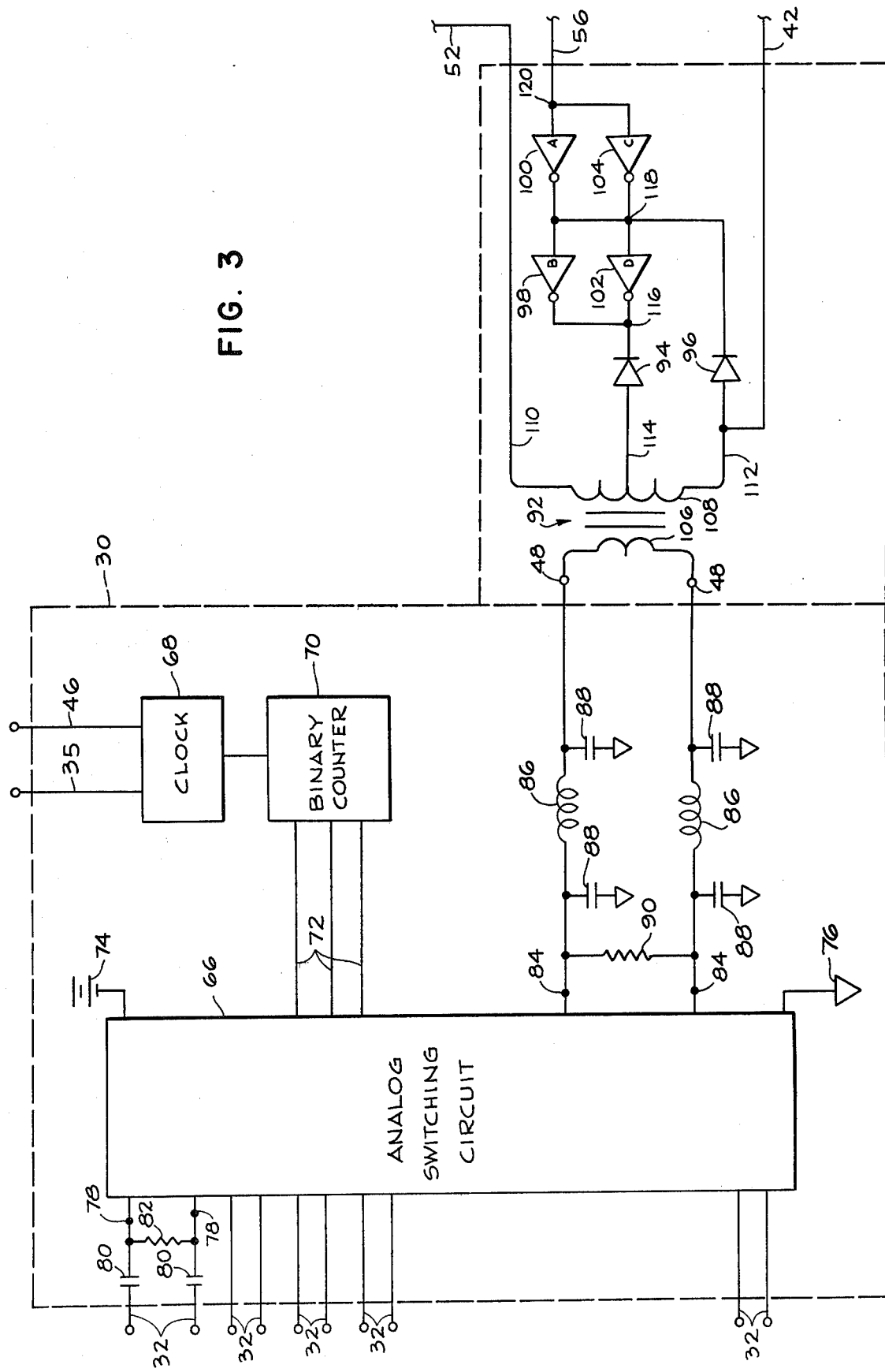
FIG. 3 is a more detailed schematic representation of the multiline sweep circuit of FIG. 1, in conjunction with a bidirectional coupling circuit shown in FIG. 2.

The scanner circuit 30 and the coupler/converter 50 are shown in more detail in FIG. 3. An analog switching circuit 66, which corresponds to the circuit 12 of FIG. 1, is driven by a gated clock 68 and a binary counter 70 through a series of conductors 72. The operation of these elements is substantially the same as that described above in relation to FIG. 1, the clock 68 producing a timed output which causes the counter 70 to continuously count through a sequence of numbers equal to the number of pairs of telephone lines 32 connected to the switching circuit. In the most common example, the binary counter will count from 1 to 8 and the switching circuit will be connected to eight pairs of telephone lines. The gated clock 68 will typically be a seam loss or TTL circuit of conventional design which is controlled by the "inhibit" input 35 and the "enable" input 46 described in relation to FIG. 2.

The analog switching circuit 66 may comprise conventional circuitry capable of sequentially coupling the primary terminals 48 to each of the pairs of telephone lines 32 in response to a characteristic input. In particular, the switching circuit 66 may be a bidirectional MOSFET analog switch such as the CMOS switch sold by Siliconics under the designation DG 507. In this case, the switching circuit 66 will be connected to a suitable power supply 74 and to ground 76.

Each of the pairs of telephone lines 32 is "ac coupled" to a pair of input pins 78 of the switching circuit 66 by a pair of in-line capacitors 80 and a bridging resistor 82. The capacitors 80 protect the switching circuit by blocking any dc signal along the telephone lines 32 and filtering any low frequency signal such as the 20 hertz ring signal used in modern telephone systems. The required return path for the high frequency telephone signal is provided by the resistor 82. In similar fashion, the primary terminals 48 are coupled to a pair of pins 84 of the switching circuit by respective inductive filters 86, each end of the inductors being connected to ground through a filter capacitor 88. A bridging resistor 90 is provided adjacent the pins 84 to establish the desired ac coupling.

The coupler/converter 50 includes a transformer 92, a pair of diodes 94 and 96 and four inverters 98, 100, 102 and 104, respectively. The transformer 92 is a center-tapped transformer having a primary coil 106 and a secondary coil 108. Outer leads 110 and 112 of the secondary coil 108 are connected to the lines 52 and 42, respectively, of the dialing system 28. A center lead 114 of the secondary coil is connected to the line 56 of the dialing system through a diode 94 and a series/parallel circuit made up of the inverters 98 through 104. That is, the inverters 98 and 102 are connected in parallel between pins 116 and 118, and in series with the inverters 100 and 104 which are themselves connected in parallel between the pin 118 and a pin 120. The inverters 98 through 104 are directed to receive signals along the line 56 from the tone encoder 40 of FIG. 2, and the diode 94 is directed to pass current from the center lead 114 of the transformer to the inverters. The diode 96 is connected between the outer lead 112 of the transformer and the pin 118 for passage of current from the outer lead.

The coupler/converter 50 controls the passage of signals to and from the lines 52 and 42 of the dialing system 28 and simultaneously serves as a converter between the balanced line (ac) telephone signals at the terminals 48 and the common ground (dc) signals along the lines 52 and 42. In the normal mode of operation, the coupler/converter 50 passes signals from the primary terminals 48 to the line 52 for application to the tone decoders 34 and 44. To accomplish this, a high logic signal is applied to the line 56 to cause the pin 118 of FIG. 3 to go low and the pin 116 to go high. This grounds the outer lead 112 through the diode 96, while isolating the pin 116 from the center transformer lead 114. The signal induced in the coil 108 thus passes to the tone decoders along the line 52 as a common ground signal. The coupler/converter 50 can be switched to an alternate mode of operation for passage of dialing signals from the line 42 to the primary terminals 48 by a high-to-low transition along the line 56. The pin 118 then goes high and the pin 116 goes low, to ground the center transformer lead 114 and isolate the outer lead 112 from the pin 118. The dialing signal from the line 42 then passes to ground along the windings of the secondary coil 108 nearest to the lead 112, and is transformed into a balanced line signal within the primary coil 106. The switching of the coupler/converter 50 between the normal and the alternate modes of operation is thus accomplished by the logic signal along the line 56 from the tone encoder 40. When the tone encoder is activated by the counter/clock 36 and the memory 38 to produce the dialing signals along the line 42, it simultaneously produces a high-to-low transition along the line 56, which places the coupler/converter 50 in the alternate mode for transmission of the dialing signals to the sweep circuit 30 and eventually to the appropriate pair of telephone lines 32. Whenever the tone encoder is not activated to send dialing signals, a "high" digital signal is applied to the line 56.

In operation, the dialing system 28 is connected to the plurality of pairs of telephone lines 32 and the sweep circuit 30 is activated to continuously scan the telephone lines for the appropriate triggering tone. Inputs from each pair of telephone lines 32 pass sequentially through the coupler/converter 50 to the tone decoders 34 and 44. During the usual functioning of the telephone circuits (not shown) associated with the telephone lines 32, neither of the tone decoders will receive a signal of the frequency to which it is tuned. Each of the buttons on the keyboard of a conventional DTMF telephone produces a pair of tones, which will not activate the exclusive tone decoder 34. Two buttons must be pressed simultaneously to produce a single tone from a DTMF set. In the case of the 941 hertz activation tone described above, such a single tone can be produced only by simultaneously depressing two of the buttons in the lowest row of the telephone keyboard. Since this is not done in the normal operation of the telephone, the dialing system 28 will not be activated inadvertently. The 400 hertz tone of the decoder 44, however, is not a DTMF telephone frequency. It is used only as a computer dial tone for the commercial telephone services known to applicants, and therefore will not be encountered in the usual operation of a telephone system.

When the tone decoder 34 receives the appropriate triggering tone from the telephone line coupled to it through the sweep circuit 30, it produces a suitable output along the lines 60 and 58 to simultaneously inhibit the sweep and activate the dialer composed of the counter/clock 36, the memory 38 and the tone encoder 40. The counter/clock 36 thus steps through the first eight of its counts before its operation is inhibited by a pause signal along the line 64 from the circuit 62. Each count causes two of the eight lines of the tone encoder 40 to be enabled, generating a corresponding DTMF dialing signal along the line 42. The eight counts act sequentially to produce a first preselected sequence of dialing signals. At the same time, a high-to-low transition is produced along the line 56 to switch the coupler/converter 50 to its alternate mode of operation. This permits the dialing signals to pass through the coupler/converter and through the sweep circuit to the pair of telephone lines 32 from which the triggering code was received. These dialing signals activate conventional telephone circuitry (not shown) of an external telephone circuit to reach a desired telephone extension. When the system is set up to dial a computer answering machine, such as that employed by commercial long distance telephone services, the sweep circuit 30 remains connected to the original pair of telephone lines at this time to permit a dial tone from the answering machine to pass through the sweep circuit to the tone decoder 44. The coupler/converter is then in its normal mode of operation by virtue of a "high" signal along the line 56. The 400 Hertz dial tone activates the tone decoder 44 to reset the inhibiting circuit 62 and cause the counter/clock 36 to step through its last eight counts. The memory 38 and the tone encoder 40 generate a second DTMF dialing signal along the line 42 in response to these eight steps. At the same time, a sequence of dialing signals in response to these eight steps. At the same time, a high-to-low transition takes place on the line 56, permitting the second sequence of dialing signals to be passed through the coupler/converter 50 and the sweep circuit 30 to the appropriate pair of telephone lines 32. This sequence of dialing signals corresponds to the personal code provided by the user by the commercial telephone service. After the counter/clock 36 steps through its entire sequence, a reset signal is applied to the sweep circuit 30 along the line 46 to cause it to resume sweeping the telephone lines in search of a triggering signal. The party on the original pair of telephone lines can then dial the area code and telephone number of the party he desires to reach and can conduct a conversation independently of the dialing system 28.

The analog switching circuit 66 (FIG. 3), and particularly the bidirectional MOSFET analog switch described above, sweep across the pairs of telephone lines 32 at a rate of approximately 100 milliseconds per pair of lines. A complete sweep through an eight-line system will thus take less than a second, permitting a user of the system to activate it by depressing the appropriate two buttons on his keyboard for approximately one second. Once the triggering tone is received by the decoder 34 (FIG. 2), dialing can begin as soon as the tone is terminated. The generation of dialing signals by the counter/clock 36, the memory 38 and tone encoder 40 may be accomplished at a rate of approximately 150 milliseconds per tone. Each of the sequences of dialing signals can thus be generated in approximately one second, enabling the dialing system 28 to perform all of its functions in a period as short as approximately three seconds. However, the operation of the dialing system 28 with a commercial telephone service of the type described above is prolonged by the time required for the Telephone Company circuitry to respond to the first sequence of dialing signals and the time required for the computer or other apparatus to answer the telephone and respond with an answering tone. It has been found that the process of reaching an open line of a commercial telephone service in the manner described above will usually take no longer than 90 seconds. The operation of the scanner circuit 30 to sweep the telephone lines 32 will therefore not be interrupted for more than 90 seconds.

Figure 4:
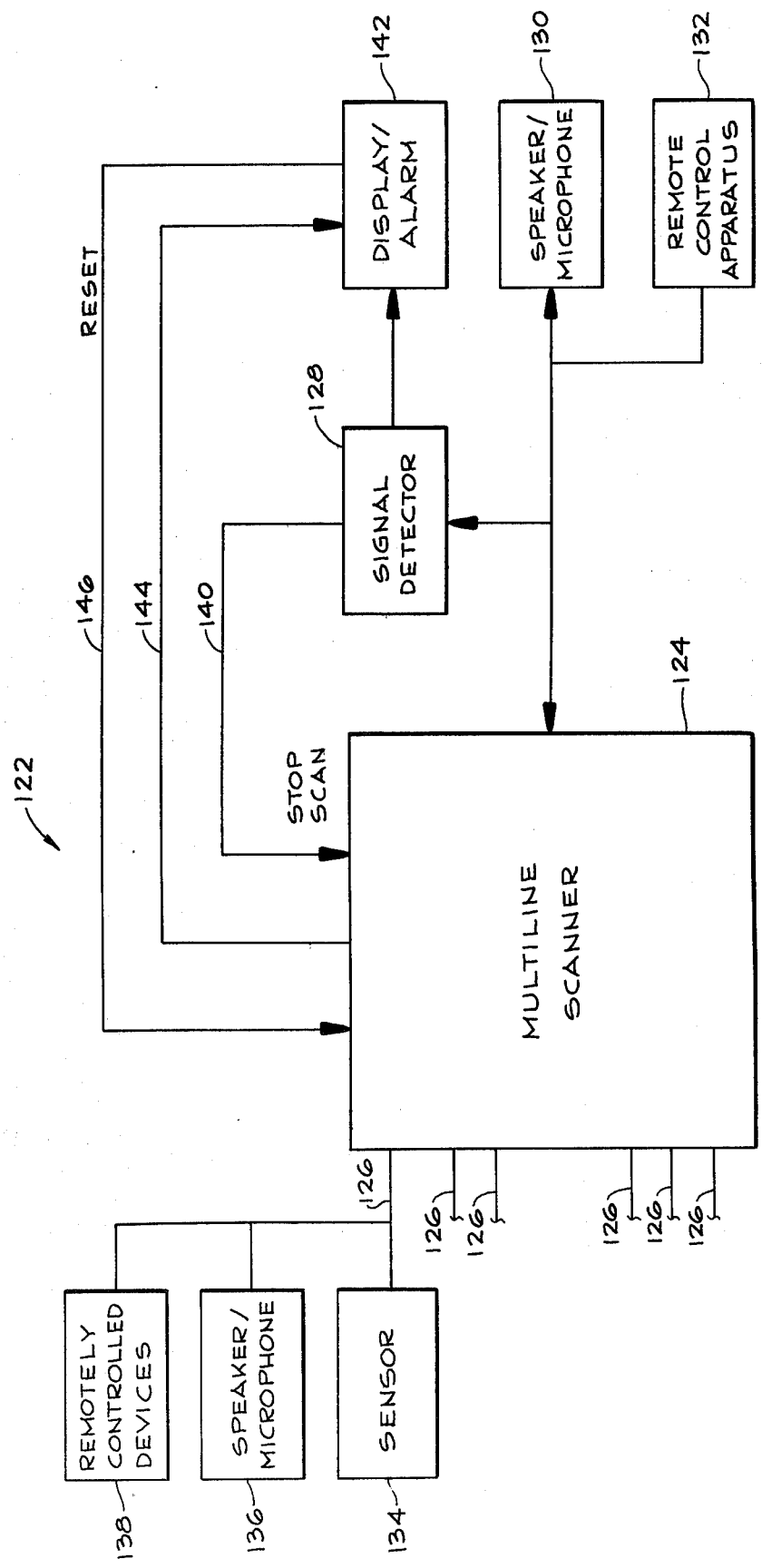
FIG. 4 is a generalized block diagram of a security system using a multiline sweep circuit constructed in accordance with the present invention.

Referring now to FIG. 4, there is shown a security system 122 constructed in accordance with a further embodiment of the present invention. The system 122 includes a multiline sweep circuit 124 which is similar to the circuits 10 and 30 described above, for sequentially connecting a series of inputs 126 to a signal detector 128, a speaker/microphone 130 and a remote control apparatus 132. Each input line 126 may be operatively connected to a sensor 134, a speaker/microphone 136 and at least one remotely controlled device 138.

In operation, the circuit 124 sweeps across the inputs 126 in search of a signal which is suitable to trigger the detector 128. The signal may, for example, be the making or breaking of an electrical circuit accomplished by an intrusion sensor of the type used in many conventional security systems, or a noise signal having a sufficient amplitude or other characteristic to activate the detector. In response to the preselected signal, the detector 128 applies an output along a line 140 to inhibit the sweep and maintain the coupling to the input 126 from which the signal was received. The detector 128 will simultaneously activate a display/alarm circuit 142 which may include a visual display, audio alarm or both. The visual display may include information as to the location of the received signal. Such information is transmitted to the element 142 along a line 144, which may be connected to a counting input (not shown) which produces the sweeping action.

Once the sweep is stopped on a particular input 126, an operator alerted by the alarm can communicate with the intruder or other person at the remote location. The operator may wish to simply listen to sounds picked up by the speaker/microphone 136 or may wish to address the suspected intruder. In addition, he may activate the remotely controlled device 138 through the apparatus 132. For example, the remotely controlled device may be a door lock or other device designed to confine the intruder until he can be apprehended. When the emergency at the location of the first detected signal has subsided, the operator can reset the scanner 124 to resume sweeping the inputs in search of an alarm signal. The resetting operation may be accomplished along a line 146 extending from the display/alarm unit 142 to the scanner.

Although the multiline sweep circuits 10, 30 and 124 have been described herein exclusively with regard to telephone and security systems, it will be appreciated that they are applicable to a wide variety of uses in which information is transmitted along a number of communication channels.

From the above, it can be seen that there has been provided an improved apparatus and method for selecting one of a plurality of communication channels in response to a preselected signal thereon.

What is claimed is:

1. Apparatus for activating an automatic dialer from any of a plurality of telephone lines, comprising:
   primary terminal means connectible to an automatic dialer;
   means for sequentially coupling the primary terminal means to a plurality of telephone lines for bidirectional transmission;
   means for sensing a preselected triggering signal on each telephone line when it is coupled to the primary terminal means;
   means for inhibiting the sequential coupling means in response to sensing of the triggering signal, leaving the line carrying the signal coupled to the primary terminal means; and
   means for activating the automatic dialer to transmit a first preselected sequence of dialing signals along said line in response to sensing of the triggering signal.

2. The apparatus recited in claim 1 wherein the coupling means comprises means for individually coupling the primary terminal means to each of the telephone lines in a continuously repeating sequence.

3. The apparatus recited in claim 2 wherein the coupling means comprises means for generating digital signals in a continuously repeating sequence and means for selectively connecting the primary terminal means to the telephone lines in response to the digital signals.

4. The apparatus recited in claim 3 which includes bidirectional conversion circuitry coupled to the primary terminal means, the conversion circuitry being constructed and arranged to pass signals from the terminal means to the sensing means in a normal mode of operation and from the dialer to the terminal means in an alternate mode of operation, the conversion circuitry being actuable from the normal mode to the alternate mode in response to the transmission of dialing signals by the dialer.

5. The apparatus recited in claim 2 which includes the automatic dialer and further comprises means for sensing an answering signal from said line and means for activating the automatic dialer to transmit a second preselected sequence of dialing signals along said line in response to the answering signal.

6. The apparatus recited in claim 5 which includes means for enabling the coupling means to resume sequential coupling of the primary terminal means to the telephone lines after transmission of the second preselected sequence of dialing signals.

7. A method for activating an automatic dialer from any of a plurality of telephone lines comprising:
   sequentially coupling at least one primary terminal to a plurality of telephone lines for bidirectional transmission;
   sensing a preselected triggering signal on each telephone line when it is coupled to the primary terminal means;
   inhibiting the sequential coupling process in response to sensing of the triggering signal, leaving the line carrying the signal coupled to the primary terminal; and
   activating the automatic dialer to transmit a first preselected sequence of dialing signals along the line in response to sensing of the triggering signal.

8. The method of claim 7 wherein the sequential coupling step comprises individually coupling the primary terminal to each of the telephone lines in a continuously repeating sequence.

9. The method of claim 8 which further comprises sensing an answering signal from the line carrying the triggering signal and activating the automatic dialer to transmit a second preselected sequence of dialing signals along the line in response to the answering signal.

10. The method of claim 9 which further comprises enabling the coupling means following the second preselected sequence of dialing signals to resume the sequential coupling process.

* * * * *

UNITED STATES PATENT AND TRADEMARK OFFICE
CERTIFICATE OF CORRECTION

PATENT NO. : 4,485,274
DATED : November 27, 1984
INVENTOR(S) : Frank C. Jordan and Knute H. Josifek It is certified that error appears in the above-identified patent and that said Letters Patent are hereby corrected as shown below:

On the heading of the first page (Item 19)
"Jordon et al." should read -- Jordan et al. --;

Line [75] of the first page
"Inventors: Frank C. Jordon, Huntington Beach" should read
-- Inventors: Frank C. Jordan, Huntington Beach --.

Signed and Sealed this

Ninth Day of April 1985

[SEAL]

Attest:

DONALD J. QUIGG

Attesting Officer

Acting Commissioner of Patents and Trademarks